United States Patent
Mishra et al.

(10) Patent No.: US 10,733,515 B1
(45) Date of Patent: Aug. 4, 2020

(54) IMPUTING MISSING VALUES IN MACHINE LEARNING MODELS

(71) Applicant: Amazon Technologies, Inc., Seattle, WA (US)

(72) Inventors: Pragyana K. Mishra, Seattle, WA (US); Naveen Sudhakaran Nair, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 776 days.

(21) Appl. No.: 15/438,390

(22) Filed: Feb. 21, 2017

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS 10,366,346 B2 * 7/2019 Achin ..................... G06Q 10/06
10,375,098 B2 * 8/2019 Oliner ................. H04L 63/1425
10,387,419 B2 * 8/2019 Li ..................... G06F 16/24554

OTHER PUBLICATIONS

Ling, Wang, and Fu Dong-Mei. "Estimation of missing values using a weighted k-nearest neighbors algorithm." In 2009 International Conference on Environmental Science and Information Application Technology, vol. 3, pp. 660-663. IEEE, 2009. (Year: 2009).*
Patil, Dipak V., and R. S. Bichkar. "Multiple imputation of missing data with genetic algorithm based techniques." IJCA Special Issue on Evolutionary Computation for Optimization Techniques (2010): 74-78. (Year: 2010).*
Raghunathan, Trivellore E., James M. Lepkowski, John Van Hoewyk, and Peter Solenberger. "A multivariate technique for multiply imputing missing values using a sequence of regression models." Survey methodology 27, No. 1 (2001): 85-96. (Year: 2001).*

* cited by examiner

*Primary Examiner* — Kamran Afshar
*Assistant Examiner* — Urmana Islam
(74) *Attorney, Agent, or Firm* — Lee & Hayes, P.C.

(57) ABSTRACT

In a machine learning environment, missing values can be imputed based upon an expectation maximization style approach. A system partitions a dataset, and uses a first partition as a training subset and a second partition as a verification subset. The training subset is used to train a machine learning model, which is then used to impute missing values in the second subset. The subsets may be swapped and the process iterates to predict missing values in the dataset with a high degree of accuracy, thereby improving both the accuracy of the machine learning model and the accuracy of the imputed values. The noise in the value prediction is reduced through a linear regression setting to account for heterogeneity in the dataset.

20 Claims, 5 Drawing Sheets

IMPUTING MISSING VALUES IN MACHINE LEARNING MODELS

BACKGROUND

In typical machine learning settings, a frequent issue that often prevents effective leverage of data is a shortage of initial data available to build or execute a model. When the available data is limited, or does not contain enough information to satisfy threshold criteria for use in machine learning or data modeling, the data may be disregarded or otherwise ignored at least until additional data is made available. As an example, a recommendation engine may not compute a recommendation for a user until at least a threshold amount of information is collected from the user, such as after the user interacts with a certain amount of content. However, even minimal amounts of data may be useful in making recommendations and can be leveraged in certain useful ways.

In prior solutions to this common problem of data shortage, researchers may assume that missing values are distributed similarly to the values that are present. In this case, the missing values may be replaced with the mean of the values that are present for that feature. This assumes that feature values are missing completely at random (MCAR).

Another solution that follows from the MCAR assumption is to replace the missing values with the median, or in some cases, replace the missing values with the most commonly occurring value, the mode.

Another approach has been to replace missing values with a constant. This approach assumes that missing values are not at random (MNAR), and that they are missing because of what the value should be. However, for many data features, this is not a viable assumption.

In many cases, these assumptions, and the added values that follow from these assumptions, affect performance of the model and can severely distort the distribution for the variable. Furthermore, mean imputation distorts the relationship between variables and underestimates the standard deviation, and further ignores any heterogeneity in the data records.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
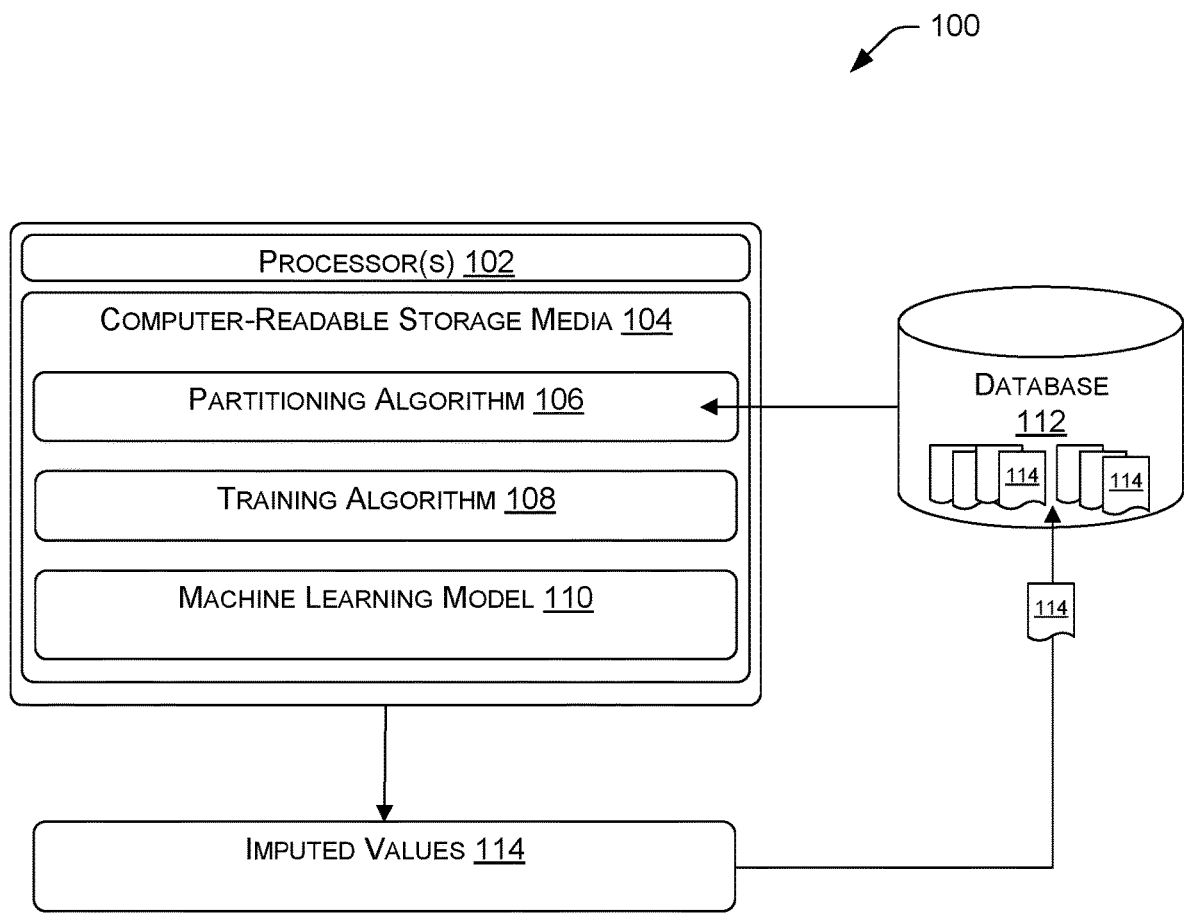
FIG. 1 is a block diagram illustrating an example of a machine learning system.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments of the present disclosure are directed to, among other things, methods for imputing missing feature values for a machine learning model. Missing feature values are common in all real-world machine learning, analytics and predictive applications. Many training and validation components of a machine learning system often discard features or instances from the outset when a certain amount of missing feature values exist. However, where the systems have few training and validation samples, discarding data is not effective because the discarded data makes up a statistically significant percentage of the overall data.

Significant improvements can be made to training and validating of machine learning models which can then be used to impute missing feature values in a data set, which considers the heterogeneity in the dataset.

According to some embodiments, a machine-based method is used to generate missing values with a machine learning model. The method includes receiving a set of data records representing multiple source variables to be used as an input to a predictive model. One of the source variables is selected as a feature of interest and the data records are partitioned into a first dataset and a second dataset. The first dataset can be selected such that there are no missing values for the feature of interest within the data records of the first dataset. The second dataset may have data records in which there are one or more missing values for the feature of interest.

The predictive model is trained by inputting the first dataset into the predictive model to create a trained model. The trained model can then be applied on the second dataset and used to generate a residual value by subtracting an actual value from a predicted value and dividing the subtraction result by a coefficient for the feature of interest. The coefficient is determined by the predictive model as it is trained on the first dataset, such as by applying a linear regression. Finally, the residual value can be used to impute the missing value into the second dataset.

The machine-based method may additionally train the predictive model by inputting the second dataset into the predictive model to create a second trained model. This may be useful where the majority of records have missing values. In cases where the data may be separated into missing and non-missing value records, the iterative approach may not be necessary, as the set of non-missing value records need not have imputed values since the actual values are present. Of course, imputing values and comparing those imputed values to actual values can nevertheless be performed to verify, or further refine, the trained model. The second trained model can then be applied on the first dataset and used to generate a residual value. The residual value may then be used to impute a predicted value into the first dataset in place of any missing values in the data records. This process may be iterated to refine the predictive model and the accuracy of the imputed values.

An error in the imputed values may be discounted by reducing the absolute value of the residual. The machine-based method may further be applied to train the second trained model by inputting the first dataset (with imputed values) into the second trained model to create a third trained model. This third trained model may then be applied on the second dataset by generating residual values for the second dataset. These residual values may then be used to generate imputed values which can be inserted into the second dataset.

This method of swapping training and verification dataset may be iterated during the predictive model training and generating the residual values to be used to impute predicted values in place of missing data in the datasets.

FIG. 1 is a block diagram illustrating an example of a machine learning system 100. The system 100, for example, may impute values into a data set to enable leveraging the data and thus avoid disregarding a sizable amount of data that is typically disregarded as incomplete. The system 100 comprises one or more processors 102. While the described system 100 may include different types and different numbers of processors, for efficiency, a single processor will be referred to, but should not be construed as limiting.

The processor 102 executes instructions stored on computer-readable storage media 104. The computer-readable storage media 104 is non-transitory and may store various instructions, routines, operations, and modules that, when executed, cause the processor 102 to perform various activities. In some implementations, the processor 102 may be a central processor unit (CPU), a graphics processing unit (GPU) or both CPU and GPU, or any other sort of processing unit. The non-transitory computer-readable storage media 104 may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information.

The computer-readable storage medium 104 stores sets of instructions including a partitioning algorithm 106, a training algorithm 108, and a machine learning model 110. A database 112 may store one or more datasets 114 to be used in conjunction with the machine learning model 110.

In use, a dataset is used as an input to the partitioning algorithm 106, which divides the dataset into two or more subsets. For example, the division may be performed by using designations, physically moving data, or both. In some instances, the partitioning is based upon the completeness of the dataset records. For example, a data set may be designated incomplete for different reasons, such as not having a threshold number of records, not having data in certain records, having a certain percentage of incomplete or non-specific information such as "not applicable" responses in a survey, and/or for other reasons. A dataset may be multidimensional and comprise hundreds or thousands (or more) of features for each data entry. A data entry may be, for example, personal information that includes information about an individual, such as name, residence address, birthday, marriage status, length of time at residence, occupation, annual salary, number of people in the household, educational information, shopping habits, online activity, and other such types of information about a person.

Based upon this type of information contained in a dataset, imputing inappropriate values for missing information could lead to problematic results in the ensuing analysis.

In some embodiments, the partitioning algorithm 106 may divide the dataset randomly into two or more subsets, such that missing feature values are randomly distributed between both subsets of the dataset. This may be accomplished, for example, by a randomizer function that orders the data records at random and then selects the first half of the records as a first subset. In other cases, the records having missing values for a feature of interest may be evenly split between the first subset and the second subset.

In other instances, the partitioning algorithm 106 may divide the dataset into two subsets, one in which the data records are complete, and the other where the records contain missing feature values. The subsets need not be of equal size, that is, a first subset may contain 20% of the total records and the second subset may contain 80% of the total records.

The training algorithm 108 then trains a machine learning model 110 (model). In some instances, the training algorithm 108 uses the data subset that has no missing values to train the model 110. The trained machine learning model (trained model) can then be used to impute values 114 to the data subset that has missing feature vales. The imputed values 114 can then be added to the dataset stored in the database 112.

There will inherently be noise in the resulting data set; however, this can be accounted for and effectively reduced or minimized as will be discussed in greater detail below. This provides a very brief overview of imputing feature values according to a general approach.

Figure 2:
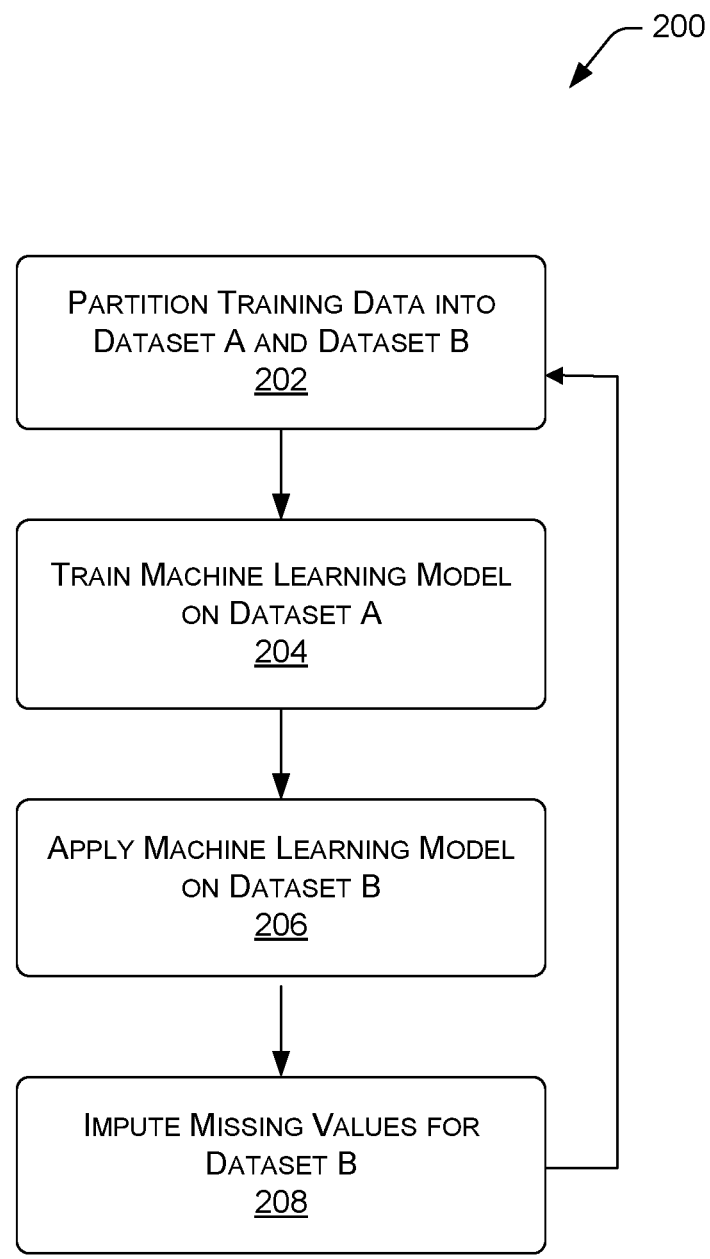
FIG. 2 is a flow diagram of an example process for training a machine learning system to impute variable values.
Figure 3:
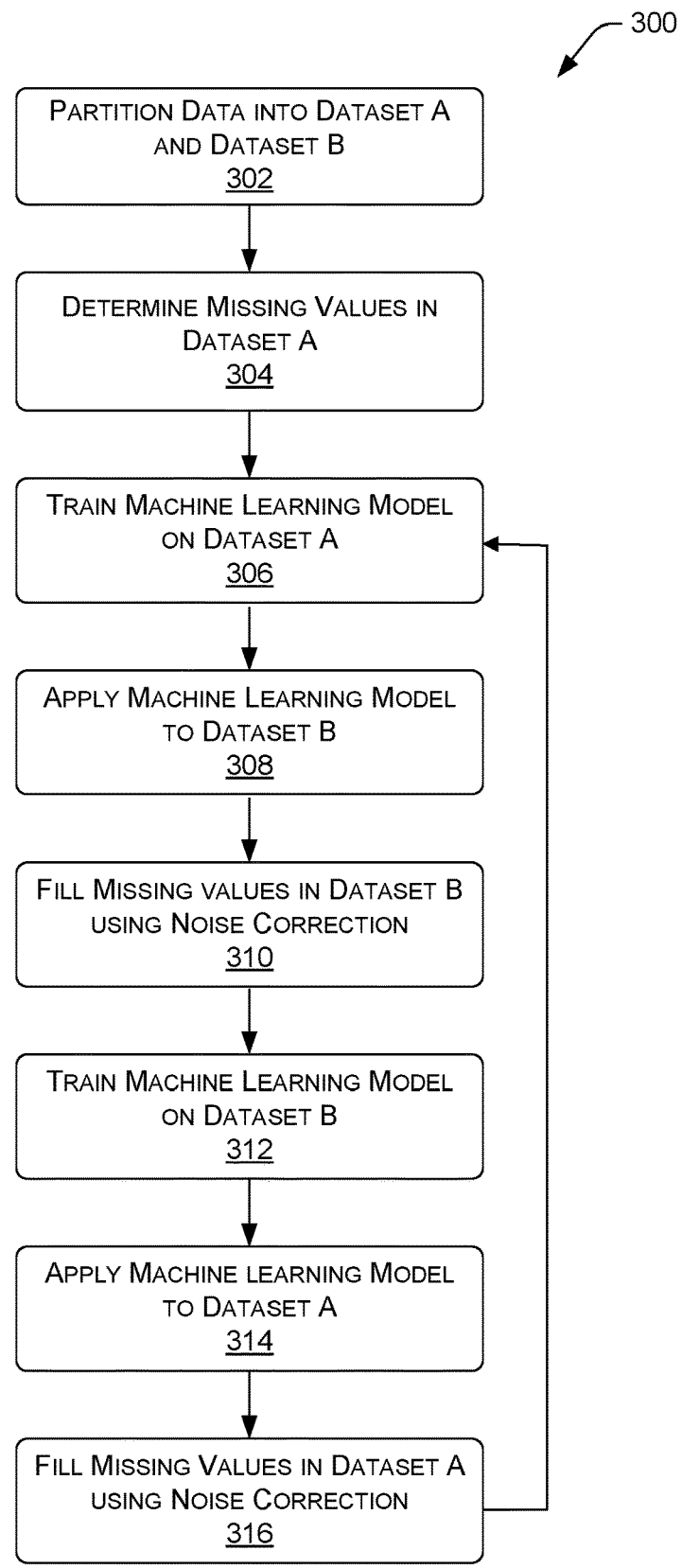
FIG. 3 is a flow diagram of another example process for training a machine learning system based upon an expectation-maximization style approach.
Figure 4:
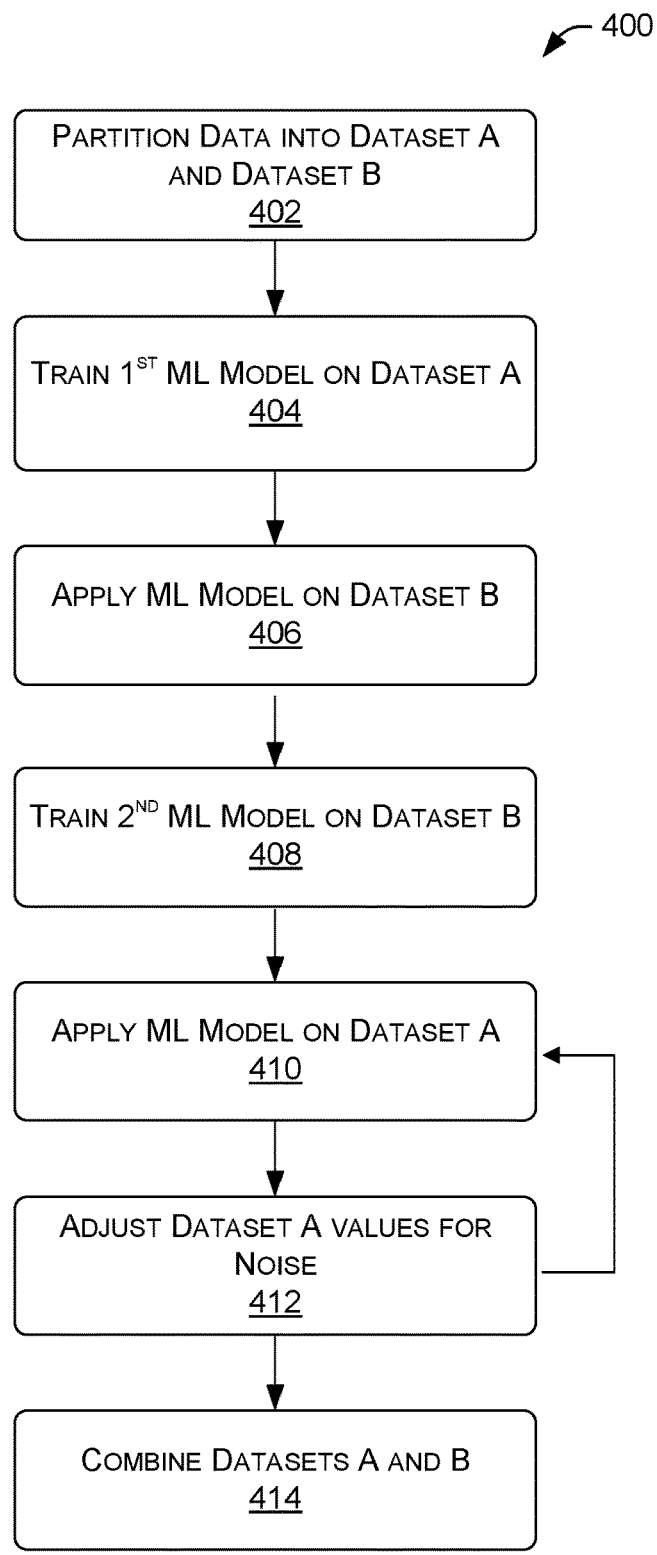
FIG. 4 is a flow diagram of another example process for training a machine learning system based upon imputing a predicted value.

FIGS. 2-4 are flow diagrams showing several illustrative routines for imputing missing feature values for machine learning models, according to embodiments disclosed herein. It should be appreciated that the logical operations described herein with respect to FIGS. 2-5 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 2 illustrates one example process 200 for training a machine learning model and imputing values in place of missing values in a dataset. At block 202 a dataset is partitioned into at least 2 subsets such as by designations, physically moving data, or both. For example, the dataset may be partitioned to create Dataset A and Dataset B. In some instances, Dataset A is determined based upon no missing feature values in the data records, while Dataset B comprises the data records that are missing at least one feature value. The feature value may be specific to a single feature within the data record and where a data record has at least a reasonable value for the feature, that data record may be assigned to Dataset A. In some cases, Dataset A may be referred to as a training dataset. The partitioning may also be done through a random distribution of data records between Dataset A and Dataset B. That is, the records may be randomized, such as by a randomization algorithm, such that any missing feature values are distributed between both Dataset A and Dataset B.

In some instances, Dataset A may be further partitioned into training data and verification data. That is, the training data may be used to train the machine learning model, and the model may then be applied to the verification data to check its accuracy. This is possible because, in this scenario, the training data and the verification data both contain all the feature values of interest, and the machine learning model's prediction can therefore be checked against actual values for accuracy.

At block 204, a first machine learning model is trained using Dataset A as training data. As described, in some instances, Dataset A includes the target features since it contains all the feature values in the data records. The training algorithm finds patterns in the Dataset A data that map the input data features to the target, and outputs a machine learning model that captures these patterns. The training algorithm may be iterated a number of times and the machine learning model may make incremental improvements in its identification of patterns and the way it is updated to account for these patterns.

At block 206, the machine learning model is applied to Dataset B in order to compute, determine, or predict values for the missing feature values based upon the previous mapping of the input data features to the target features. As a simple example, where a data record is missing the value for dog ownership, if the data record further indicates a shopping history that includes dog food purchases, the system may map the purchase of dog food to the feature of dog ownership and fill in the missing value in the affirmative. Of course, this is a simple example, and the machine learning model may look to many features in order to determine patterns and may not rely upon a single input mapped to a single output.

Depending on the expected feature value, the model includes binary classification in which the model predicts one of two possible output classes, such as whether an individual is male or female. In some cases, the model includes multiclass classification in which the model predicts one of many possible outcomes, such as a previous webpage a visitor viewed before arriving at a current webpage. In various instances, the model includes regression, in which a numeric value may be predicted, such as the number of years someone has been employed by a particular company. Based on the type and amount of missing data, one or more of these strategies can be used to effectively build and train the model.

At block 208, the missing feature values may be imputed. For example, in the situation where every data record has at most only one feature value missing, the residual value can be computed and used to determine a predicted value. That is, the residual (i.e., actual value minus predicted value) can be divided by the coefficient the model has learned for this feature. A linear regression model provides a prediction based upon the residual.

That is, for record i and feature j, the value v may be determined according to Equation 1 as follows:

$$v_i^j = \frac{(y_i - y_i')}{\beta_j} \qquad \text{Eq. 1}$$

where y is the actual value and y' is the predicted value from the model and $\beta$ is the coefficient learned for the feature of interest.

In some instances, there may be noise in the data, which the above example does not account for, which may introduce statistically significant inaccuracies in the data and any resulting analysis of the data. In a similar approach, the noise can be discounted from the residual value.

The missing values can be predicted with noise correction and entered into Dataset B. One way of doing this is to use Dataset A as training data which may be created in such a way that it does not include any missing values for the feature of interest. Dataset A can be scored with the machine learning model and the mean absolute error (MAE) can be computed. For each record, the absolute error is the absolute value of the difference between the actual value and the predicted value. The average of the absolute error is the MAE. The residual may be adjusted for each missing feature value in the direction of zero. That is, the absolute value of the residual is reduced. This may be performed by Equation 2 as follows:

$$v_i^j = \frac{(y_i - y_i') - MAE \times \frac{y_i - y_i'}{|y_i - y_t'|}}{\beta_j}. \qquad \text{Eq. 2}$$

In other words, for record i and feature j, the feature value v may be determined by computing the mean absolute error and multiplying by the residual over the residual absolute value. This is subtracted from the residual and divided by the coefficient learned for that feature.

For a binary feature, that is, where there is one out of a possible two values, the result of equation 2 is a probability of one value or the other. For example, if the feature value is gender, the result of equation 2 provides a probability of the true value being either male or female. In those instances where the feature may be a multiclass classification, the result of equation 2 provides a propensity for the predicted behavior.

As a simple example, where the feature value of interest is whether a person visits a social networking site more than ten times per day, the machine learning model, by finding patterns in the population of data records that indicate a correlation between input values and the value of interest, can provide a person's propensity for satisfying this criteria, and accurate values can be imputed to the data record for this feature. In a similar way, the approach may be generalized to consider a broad variety of target variables and the missing values for all the features may be determined by training the model to recognize the interdependencies within the entire dataset, such that applying the model to a dataset may determine values for all the missing feature values within the dataset.

This simplistic approach briefly illustrates how partitioning a dataset into subsets based upon completeness of data records allows a machine learning model to be created and used to impute missing feature values based upon associations between input values and target values.

FIG. 3 illustrates an example process 300 for training a machine learning model and imputing values in place of missing values in a dataset. This particular process 300 may be used where a majority of the data records have at least one missing feature value. Of course, where every data record is missing at least one feature value, this approach may work as well. At block 302, the data records are partitioned into Dataset A and Dataset B. The data records may be partitioned randomly, such that the missing feature values are randomly distributed between Dataset A and Dataset B, such as by applying a randomizing algorithm to the data records and specifying that the data records are to be broken up into two or more subsets. In some instances, Dataset A and Dataset B have an equal number, or an about equal number, of data records. This approach contrasts with the above approach described in relation to FIG. 2 in which there the data records are partitioned based upon completeness of the record. In this example, the data records are randomly partitioned such that missing values occur at random between Dataset A and Dataset B.

At block 304, missing values in Dataset A are determined. This may be accomplished on a feature by feature basis, for example, by imputing the mean value of the available feature values for a particular feature. Other strategies may be utilized to fill the missing feature values, such as filing the missing values with the mode value from the records within Dataset A that contain a value for the feature of interest, or with the median value from the records within Dataset A that contain a value for the feature of interest. Dataset A, having the missing values replaced with a value, can now be used as a training dataset for the machine learning model.

At block 306, the machine learning model is trained on Dataset A. This may be performed, for example, by using Dataset A as training data, which contains all the target feature values. The machine learning model finds patterns in the training data that associate the input data to the target data and outputs these patterns as a trained machine learning model. As a simple example, where the target feature is that of annual salary, the machine learning model may find a correlation between occupation and salary, or between residence zip code and salary, or between make/model of car and salary, or it may find a pattern that correlates all these feature values, and more, with a target annual salary.

At block 308, the machine learning model is applied to Dataset B to predict the missing values. In some instances, the missing values are treated as null or zero and a residual value can be calculated and used to determine a prediction for the missing feature values.

At block 310, the missing values for Dataset B are predicted with noise correction and entered into Dataset B, according to Equation 2 reproduced above which imputes the predicted value that has been corrected for noise. Of course, if actual values become available, the imputed predicted value may be replaced with the actual value and the model may be validated by comparing the actual vale with the imputed predicted value.

At block 312, once Dataset B has been run through the machine learning model and the missing feature values have been predicted and filled in, Dataset B now becomes the training data and can be used to train the machine learning model. In some instances, Dataset B can be partitioned into two subsets and one subset of this data can be used for training and the other subset can be used for verification.

At block 314, the machine learning model is applied to Dataset A to predict the missing feature values in the data records.

At block 316, the missing feature values can be filled into Dataset A, such as by using Equation 2 discussed above. From here, blocks 306 through 316 may be iterated a number of times, by swapping Dataset A and Dataset B as training data and scoring data with each iteration. The number of required iterations depends on the number of records, the complexity of the records, and the number of observations. However, through the iterative process, the model will tend to converge and the process may stop at convergence, or within a predetermined threshold of convergence. In other words, the residual value that indicates the difference between the actual value and the predicted value will converge at zero, or close to zero.

This approach can be extended to categorical variables with the assumption that the missing feature values can by any of the known categories. This approach can further be applied to categorical variables constructed by discretization of numeric variables, such as where variables have been converted to nominal features. This may be useful, for example, when creating probability mass functions or histogram functions. Data is typically discretized into partitions of equal length or equal frequencies of the total data.

Unlike imputing predicted values, for each record with missing feature values, the missing value may be replaced with each of the known values. The final values can then be selected depending on which values makes the residual take on a value of zero, or close to zero.

As an example of a real-world dataset that benefits from the aforementioned processes, when a user signs up for an account with an online social media provider, the user enters a certain limited amount of information about herself. Moreover, the activities of the user on the social media website are typically followed and form a part of the user profile. In addition to the user profile on the social media website, the user may create linkages between a first social media website, a second social media website, a photo sharing website, and one or more online shopping websites, to name a few.

With these linkages, oftentimes the information specific to a user is shared among the various linked websites. For example, a photo sharing website may track information regarding the types of photos a person likes, uploads, shares, or comments on. This information can be used to infer likes and/or dislikes of the user. Similarly, online shopping websites track consumer shopping behaviors including the types of goods or services a user purchases, the frequency of purchasing, the purchase amounts the user spends while online shopping, among other features that are specific to a consumer.

This type of information, especially when collected and agglomerated, provides some valuable information that tends to allow for understanding of predilections and allows for more accurate predictions of future behavior. Furthermore, understanding this type of information allows a content provider to maximize the engagement with the user by providing, promoting, or offering content that a particular user is likely to find attractive.

However, in any one of these user profiles, there may be missing feature values that would be helpful to know. Furthermore, even if several different user profiles from different content providers are collected, there may still be many missing feature values. As described above, these missing feature values may be predicted with relatively high accuracy. Not only will knowledge of social attributes aid in increasing the accuracy of prediction models, but can also be used to infer the missing feature values, thereby increasing the accuracy of the model. That is, the machine learning model will not only be used as a prediction engine to impute values with a high degree of accuracy, but these imputed values are also used to iteratively train the machine learning model thereby improving its predictions.

FIG. 4 illustrates another example process for imputing values to missing feature values in a machine learning model.

At block 402, a dataset is partitioned into Dataset A and Dataset B. In some cases, the partitioning me be based upon complete versus incomplete records. In other instances, the partitioning is done completely at random such that missing values are randomly distributed through both Dataset A and Dataset B.

At block 404, a first machine learning model is trained on Dataset A. In some cases, Dataset A is subdivided into two parts, one for training and one for verification. While this may be a useful validation tool, it is optional and may not be performed in every case. The first machine learning model is trained by looking for patterns within the Dataset, such that an input feature corresponds with a target feature. For example, the machine learning model may recognize a pattern between height and shoe size. That is, if the input feature is a male standing 6 feet 4 inches tall, the target feature may be that he wears size 13 shoes. The machine learning model may find this correlation between these two feature values.

As another example, a shopping website may track the monthly purchase amounts that a user makes on the shopping website. Based upon this value, the machine learning model may recognize patterns between the monthly purchase amounts and features such as the number of times the user visits a website, the number of times the user glances at an item before purchasing, an identification of social networking sites the user is active on, the user's age or other demographic information, whether the user is a student, or is a salaried employee, among other features.

Accordingly, if the dataset includes as a data record, user "M" who is 6 feet 4 inches tall and has a predilection for basketball, the machine learning model may impute that user M is likely to want to purchase size 13 basketball shoes. Continuing with the example, if user M is part of a population segment, and the dataset indicates that other users within the same population segment visit a particular social media website more than ten times per day, then the machine learning model may impute that user M also visits a particular social media website a similar number of times per day. Accordingly, with this information, an online retailer may pay more for targeted advertising on the social media website offering size 13 basketball shoes to user M. The online retailer may not have any of this information in their own profile for user M; however, by leveraging data from outside sources, a machine learning model may collect relevant data to add to a customer profile and impute values for the missing feature values.

At block 406, the machine learning model is applied on Dataset B and is used to fill in the missing feature values with imputed values.

At block 408, a second machine learning model is trained on Dataset B. In many cases, the second machine learning model is the first machine learning model after it has been trained on Dataset A, and may be considered a second machine learning model. Dataset B may be partitioned into training data and validation data. In some scenarios, the missing values in Dataset B are filled in with mean, median, or mode values in order to train the machine learning model. As the model progresses, those initial mean, median, or mode values, may be replaced with imputed values from the machine learning model.

At block 410, the second machine learning model is applied on Dataset A and missing feature values from Dataset A are imputed by the machine learning model.

At block 412, the Dataset A values are adjusted for noise, as previously described above. An error metric may be calculated based on the mean absolute error. That is, for each record, the absolute error is the absolute value of the difference between the actual value and the predicted value. The average of the absolute error is the MAE. Blocks 410 and 412 may be iterated a number of times until the error metrics are no longer decreasing in Dataset A.

In the case of multiple feature values missing in data records, the residual value can be split among features and divided by the corresponding coefficient. The residual may also be a weighted division, based on the median, mean, or range of values in other records.

At block 414, the Dataset may be recombined in a database to form complete data records with little or no missing feature values of interest.

Figure 5:
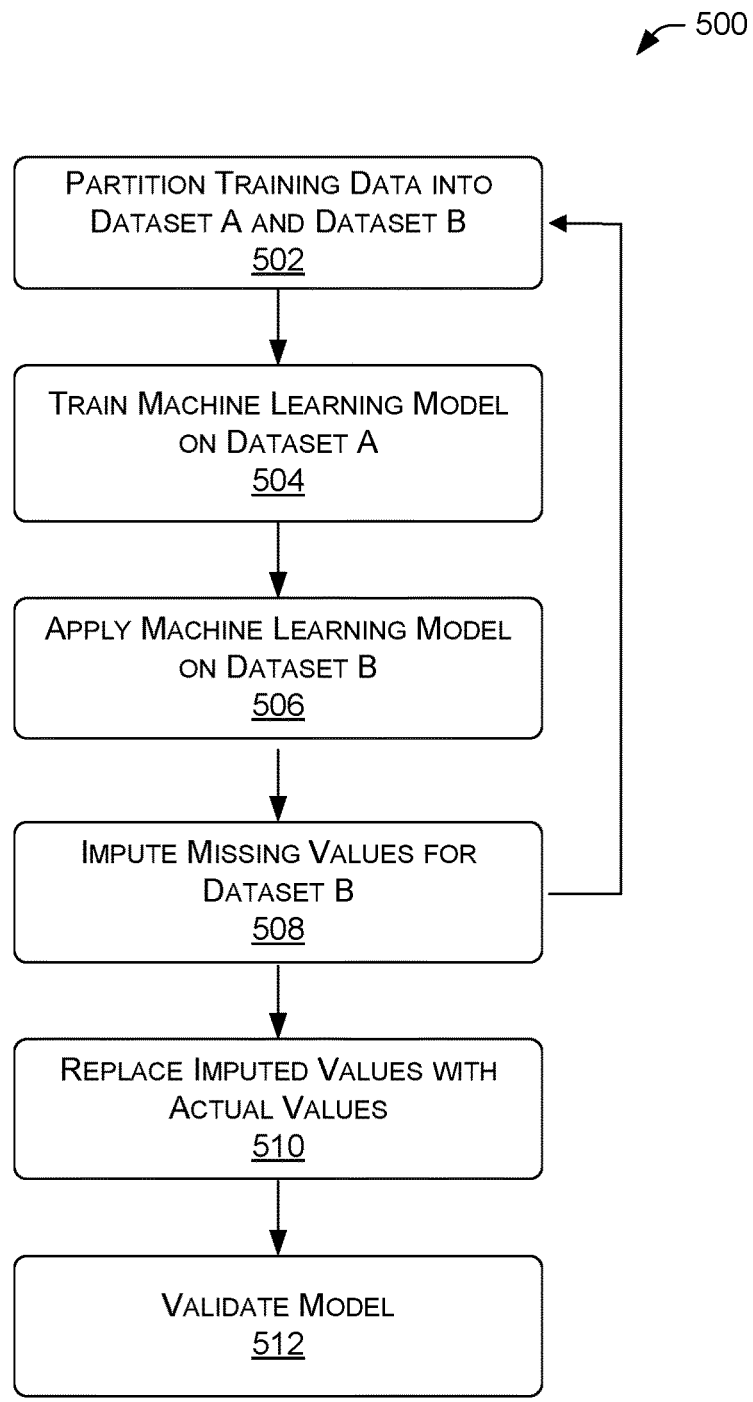
FIG. 5 is a flow diagram of an example process for training a machine learning system to impute variable values and receiving actual values.

FIG. 5 illustrates another example process 500 for imputing values to missing feature values in a machine learning model wherein the residual values are tagged. At block 502, training data is partitioned into Dataset A and Dataset B as previously described. It may be partitioned based on the completeness of records or at random depending on the size, number, and complexity of the data records.

At block 504, a machine learning model is trained by using the data records in Dataset A as training data and searching for patterns that correlate an input value with a target value. For example, the machine learning model may recognize that, of the data records that include the relevant feature values, there may be a strong correlation between the number of times an individual visits a social media website in a day, and the user's proclivity for making online purchases.

At block 506, the machine learning model is applied on Dataset B and is used to compute, determine, or predict the missing feature values based upon the previous mapping of the input data features to the target features. For example, where a data record is missing a user's cadence for online shopping transactions, if the data record indicates that the user visits a social media website a number of times that is above a threshold number, the machine learning model may predict that the user makes purchases from an online retailer on average of twice per month.

At block 508, the machine learning model may impute information relating to the cadence of online purchases into the data records to fill in the missing value for cadence of online purchases. The imputed values may be tagged, or otherwise marked, as imputed values. This allows the machine learning model to later ascertain the values in the data records that are actual values versus those values that were imputed by the machine learning model. The process of blocks 502 through 508 can be iterated to improve the accuracy of the machine learning model and of the imputed values.

At block 510, the imputed values may be replaced with actual values. That is, where the data records are later updated with actual information, the actual values may replace the imputed values. For example, a database containing data records may be updated by tracking historical behavior of a user associated with a data record. Where a user newly creates a customer profile at an online retailer's website, there may be very little historical shopping history. As time passes and the user's shopping behaviors are tracked, information can be gleaned from the behavior and used to fill in actual values within the data record. As another example, a database may become newly linked with a new source of data that contains feature values related to a data record previously stored in the database, but for which feature values were missing. These actual values may replace the previously imputed values.

At block 512, the model can further be validated by comparing the newly acquired actual values to the imputed values predicted by the machine learning model. In this way, the machine learning model is continuously improved as more data becomes available.

As described herein, not only is a machine learning model used to back-calculate missing feature values by imputing those values, but in doing so, the machine learning model increases its own accuracy, which increases the accuracy of future imputed feature values. The accuracy of both the model and the imputed values increases until the error metrics associated with the model converge. In other words, through training and validation, the machine learning model generates the missing values with a high degree of accuracy, and through iterating the training and validation process, the machine learning model increases its own accuracy. Thus, the machine learning model is used to improve the machine learning model, while filling in missing feature values. For further validating the model, some of the known actual values may be temporarily deleted and the machine learning model can determine the missing values, which are then compared with the actual values to determine the accuracy of the model. The model may then appropriately be adjusted to decrease the difference between the predicted value and the actual value.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A machine-based method to generate missing values with a machine learning model, comprising:
   receiving a set of data records, the set of data records representing multiple source variables to be used as an input to a predictive model;
   selecting at least one source variable as a feature of interest;
   partitioning the set of data records into a first dataset and a second dataset, the first dataset having no missing values for the feature of interest, the second dataset having one or more missing values for the feature of interest;
   training the predictive model by inputting the first dataset into the predictive model to create a trained model;
   applying the trained model on the second dataset, wherein applying the trained model on the second dataset comprises:
      subtracting a predicted value from an actual value to generate a residual value; and
      dividing the residual value by a coefficient for the feature of interest to determine a value to impute to a missing value in the second dataset; and
   imputing the value to the missing value in the second dataset.

2. The machine-based method as recited in claim 1, further comprising:
   training the predictive model by inputting the second dataset into the predictive model to create a second trained model;
   applying the second trained model on the first dataset.

3. The machine-based method as recited in claim 2, further comprising discounting an error from the residual value by reducing the absolute value of the residual value.

4. The machine-based method as recited in claim 2, further comprising:
   training the second trained model by inputting the first dataset into the second trained model to create a third trained model;
   applying the third trained model on the second dataset.

5. A machine-based method for generating values that are missing in a data record, the method comprising:
   receiving a set of data records, the set of data records representing individual records having a plurality of features, and wherein one or more individual data records of the set of data records is missing one or more values;
   partitioning the set of data records into a first dataset and a second dataset, wherein the first dataset comprises one or more records missing one or more values, and the second dataset comprises one or more records missing one or more values;
   selecting a feature of interest of the plurality of features;
   replacing one or more missing values associated with the feature of interest in the first dataset with a mean value of feature values associated with the feature of interest to create a modified first dataset;
   training a predictive model by inputting the modified first dataset into the predictive model to create a trained model;
   applying the trained model to the second dataset;
   determining a predicted value for one or more missing values associated with the feature of interest in the second dataset;
   determining a coefficient for the feature of interest using a linear regression model;
   subtracting the predicted value from an actual value to create a residual value;
   dividing the residual value by the coefficient for the feature of interest to determine a value for the one or more missing values associated with the feature of interest in the second dataset; and
   replacing the one or more missing values associated with the feature of interest in the second dataset with the value.

6. The machine-based method as in claim 5, further comprising:
   training the predictive model by inputting the second dataset into the predictive model to create a second trained model; and
   applying the second trained model to the first dataset.

7. The machine-based method as in claim 5, further comprising calculating an error metric indicating how the residual value compares with the actual value.

8. The machine-based method as in claim 7, further comprising iteratively training the predictive model until the error metric converges to value below a threshold error metric value.

9. The machine-based method as in claim 7, further comprising using the error metric to reduce the absolute value of the residual value.

10. The machine-based method as in claim 5, further comprising:
partitioning the first dataset into a training dataset and a verification dataset;
training the predictive model on the training dataset; and
applying the predictive model on the verification dataset.

11. The machine-based method as in claim 5, wherein an individual record of the set of data records has a plurality of features, the plurality of features compiled from multiple source databases.

12. The machine-based method as in claim 11, wherein the multiple source databases are maintained by one or more of a social media content provider website, an online shopping website, or a digital content provider.

13. The machine-based method as in claim 5, wherein partitioning the set of data records comprises:
parsing the set of data records to search for individual records having a feature value associated with the feature of interest; and
combining the individual records having the feature value associated with the feature of interest into the first dataset.

14. The machine-based method as in claim 5, wherein partitioning the set of data records comprises:
parsing the set of data records to search for individual records having a missing value associated with the feature of interest; and
randomly partitioning the data records into the first dataset and the second dataset such that the individual records having the missing value associated with the feature of interest are randomly distributed between the first dataset and the second dataset.

15. A method for training a machine learning model, comprising:
partitioning a dataset into training data and verification data;
training the machine learning model on the training data;
verifying the machine learning model on the verification data to create prediction data;
comparing the prediction data to actual data to generate an error;
identifying a missing value in the verification data; and
subtracting the prediction data from the actual data to generate a residual value; and
dividing the residual value by a coefficient for a feature of interest associated with the actual data to determine a value to replace the missing value in the verification data; and
replacing the missing value in the verification data with the value.

16. The method as in claim 15, further comprising:
training the machine learning model on the verification data;
verifying the machine learning model on the training data to create second prediction data;
comparing the second prediction data to the actual data to generate a second error.

17. The method as in claim 16, further comprising iterating between the training of the machine learning model and the verifying of the machine learning model by iteratively using the training data to train the machine learning model and the verification data to verify the machine learning model and then using the verification data to train the machine learning model and the training data to verify the machine learning model.

18. The method as in claim 17, further comprising generating an error value and wherein iterating comprises iterating between the training of the machine learning model and the verifying of the machine learning model until the error value converges to below a threshold value.

19. The method as in claim 15, wherein partitioning the dataset into training data and verification data is based, at least in part, upon completeness of one or more records in the dataset.

20. The method as in claim 15, wherein partitioning the dataset into training data and verification data is based, at least in part, upon a random distribution of a missing value for a feature of interest in one or more records in the dataset.

* * * * *